US010323519B2

(12) United States Patent
Porter et al.

(10) Patent No.: US 10,323,519 B2
(45) Date of Patent: Jun. 18, 2019

(54) GAS TURBINE ENGINE HAVING A TURBINE ROTOR WITH TORQUE TRANSFER AND BALANCE FEATURES

(71) Applicant: United Technologies Corporation, Farmington, CT (US)

(72) Inventors: Steven D. Porter, Wethersfield, CT (US); Julian Partyka, West Springfield, MA (US); Raymond S. Hummel, South Windsor, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 406 days.

(21) Appl. No.: 15/190,494

(22) Filed: Jun. 23, 2016

(65) Prior Publication Data

US 2017/0370224 A1    Dec. 28, 2017

(51) Int. Cl.
*F01D 5/10* (2006.01)
*F01D 5/02* (2006.01)
(Continued)

(52) U.S. Cl.
CPC ............. *F01D 5/027* (2013.01); *F01D 5/026* (2013.01); *F01D 5/066* (2013.01); *F01D 11/006* (2013.01);
(Continued)

(58) Field of Classification Search
CPC .......... F01D 5/027; F01D 5/026; F01D 5/066; F01D 11/006; F01D 5/082; F02C 3/04;
(Continued)

(56) References Cited

U.S. PATENT DOCUMENTS 1,502,903 A * 7/1924 Campbell ............. F01D 21/003
  415/119
3,610,069 A * 10/1971 Tanner .................... D06F 37/24
  210/363

(Continued)

FOREIGN PATENT DOCUMENTS

GB       2270544 A     3/1994
WO   2014120135 A1    8/2014
(Continued)

OTHER PUBLICATIONS

European Search Report for European Application No. 17177510.9 dated Dec. 8, 2017, 8 pages.

*Primary Examiner* — Jason D Shanske
*Assistant Examiner* — Brian Christopher Delrue
(74) *Attorney, Agent, or Firm* — Cantor Colburn LLP

(57) ABSTRACT

A rotor disc assembly includes a rotor disc and a minidisc. The rotor disc has a first extension member, a first finger, and a second finger. The first extension member axially extends from a disc body disposed about an axis. The first finger extends axially from the first extension member. The second finger is circumferentially spaced apart from the first finger. The second finger extends axially from the first extension member. Each of the first finger and the second finger has a first portion and a second portion that extends radially from a distal end of the first portion. The minidisc is operatively connected to the rotor disc. The minidisc has an interlocking finger that radially extends from a minidisc body and is disposed between the first finger and the second finger. The interlocking finger, the first portion, and second portion define a ring groove.

25 Claims, 8 Drawing Sheets

(51) Int. Cl.
   *F01D 11/00* (2006.01)
   *F02C 3/04* (2006.01)
   *F02C 7/28* (2006.01)
   *F01D 5/06* (2006.01)
   *F01D 5/08* (2006.01)

(52) U.S. Cl.
   CPC .................. *F02C 3/04* (2013.01); *F02C 7/28* (2013.01); *F01D 5/082* (2013.01); *F05D 2220/32* (2013.01); *F05D 2240/55* (2013.01); *F05D 2260/4031* (2013.01)

(58) Field of Classification Search
   CPC .... F02C 7/28; F05D 2220/32; F05D 2240/55; F05D 2260/4031; F05D 5/26; F05D 2250/182; F16F 15/32
   USPC ......................................................... 416/144
   See application file for complete search history.

(56) References Cited

U.S. PATENT DOCUMENTS

| | | | | |
|---|---|---|---|---|
| 3,965,382 A * | | 6/1976 | McCrosky | F16F 15/32 310/51 |
| 4,177,692 A * | | 12/1979 | Irwin | F01D 5/027 464/180 |
| 4,192,633 A * | | 3/1980 | Herzner | F01D 5/10 415/119 |
| 4,304,523 A * | | 12/1981 | Corsmeier | F01D 5/3015 29/889.21 |
| 4,648,799 A * | | 3/1987 | Brown | F01D 5/3015 416/220 R |
| 4,664,599 A * | | 5/1987 | Robbins | F01D 5/066 416/198 A |
| 4,784,012 A * | | 11/1988 | Marra | F01D 5/027 415/119 |
| 4,803,893 A * | | 2/1989 | Bachinski | F01D 5/027 415/119 |
| 4,835,827 A * | | 6/1989 | Marra | F01D 5/027 29/407.01 |
| 4,848,182 A * | | 7/1989 | Novotny | F01D 5/027 464/180 |
| 4,879,792 A * | | 11/1989 | O'Connor | F01D 5/027 29/889 |
| 4,890,981 A * | | 1/1990 | Corsmeier | F01D 5/3015 416/220 R |
| 4,926,710 A * | | 5/1990 | Novotny | F01D 5/027 29/447 |
| 5,018,943 A * | | 5/1991 | Corsmeier | F01D 5/027 416/144 |
| 5,167,167 A * | | 12/1992 | Tiernan, Jr. | F16F 15/32 29/894 |
| 5,173,024 A * | | 12/1992 | Mouchel | F01D 5/066 416/220 R |
| 5,256,035 A * | | 10/1993 | Norris | F01D 5/3015 416/220 R |
| 5,288,210 A * | | 2/1994 | Albrecht | F01D 5/066 416/198 A |
| 5,954,477 A * | | 9/1999 | Balsdon | F01D 11/006 415/173.7 |
| 6,588,298 B2 * | | 7/2003 | Czerniak | F01D 5/027 416/145 |
| 6,951,448 B2 * | | 10/2005 | Duesler | F01D 5/323 416/220 R |
| 7,040,866 B2 * | | 5/2006 | Gagner | F01D 5/3015 416/220 R |
| 7,069,654 B2 * | | 7/2006 | Robbins | F01D 5/027 29/406 |
| 7,296,976 B2 * | | 11/2007 | Roever | F01D 5/027 416/144 |
| 7,491,031 B2 * | | 2/2009 | Brault | F01D 5/027 416/119 |
| 7,775,723 B2 * | | 8/2010 | Maffre | F01D 25/16 384/537 |
| 7,780,419 B1 * | | 8/2010 | Matheny | F01D 5/005 416/221 |
| 8,122,785 B2 * | | 2/2012 | Czerniak | F01D 5/027 73/470 |
| 8,303,255 B2 * | | 11/2012 | Ramlogan | G01M 1/36 416/144 |
| 8,348,616 B2 * | | 1/2013 | Williams | F01D 5/027 416/119 |
| 8,353,670 B2 * | | 1/2013 | Glasspoole | F01D 5/027 416/144 |
| 8,360,728 B2 * | | 1/2013 | Hildebrand | G01M 1/36 415/119 |
| 8,506,253 B2 * | | 8/2013 | Lecuyer | F01D 5/027 416/145 |
| 8,579,538 B2 * | | 11/2013 | Juh | F01D 5/066 403/359.5 |
| 8,840,375 B2 * | | 9/2014 | Virkler | F01D 5/066 416/221 |
| 8,888,458 B2 * | | 11/2014 | Billings | F01D 5/027 416/144 |
| 9,297,258 B2 * | | 3/2016 | Woods | F01D 5/027 |
| 9,920,626 B2 * | | 3/2018 | Casaliggi | F01D 5/02 |
| 9,933,005 B2 * | | 4/2018 | Kahl | B23P 19/084 |
| 9,957,799 B2 * | | 5/2018 | Arnold | F01D 5/027 |
| 10,024,183 B2 * | | 7/2018 | Partyka | F01D 5/3015 |
| 2003/0213334 A1 * | | 11/2003 | Czerniak | F01D 5/027 416/145 |
| 2005/0232760 A1 * | | 10/2005 | Wagner | F01D 5/3015 415/191 |
| 2009/0022593 A1 * | | 1/2009 | Oka | F01D 5/3015 416/220 R |
| 2009/0133494 A1 * | | 5/2009 | Van Dam | G01M 1/36 73/460 |
| 2009/0269202 A1 * | | 10/2009 | Borzakian | F01D 5/027 416/220 R |
| 2009/0304509 A1 * | | 12/2009 | Blanchard | F01D 5/027 416/144 |
| 2010/0247313 A1 * | | 9/2010 | Baryshnikov | F04D 29/2266 416/144 |
| 2011/0176925 A1 * | | 7/2011 | Anderson | F01D 5/3015 416/221 |
| 2011/0197703 A1 * | | 8/2011 | Badre-Alam | B64C 11/008 74/574.1 |
| 2012/0027598 A1 * | | 2/2012 | Caprario | F01D 5/082 416/193 R |
| 2012/0051918 A1 * | | 3/2012 | Glasspoole | F01D 5/025 416/204 A |
| 2013/0216383 A1 * | | 8/2013 | Brathwaite | F01D 5/027 416/144 |
| 2013/0336785 A1 * | | 12/2013 | Hummel | F01D 5/066 415/220 |
| 2014/0064958 A1 * | | 3/2014 | Kobayashi | F04D 29/329 415/220 |
| 2014/0079537 A1 * | | 3/2014 | Arnold | F01D 5/027 415/119 |
| 2015/0369061 A1 * | | 12/2015 | Sandoval | F02C 3/04 60/805 |
| 2016/0168996 A1 * | | 6/2016 | Mariano | F01D 5/027 416/144 |
| 2017/0268351 A1 * | | 9/2017 | Oren | F01D 9/02 |
| 2017/0268352 A1 * | | 9/2017 | Oren | F01D 9/02 |
| 2017/0268353 A1 * | | 9/2017 | Porter | F01D 5/02 |
| 2017/0268354 A1 * | | 9/2017 | Oren | F01D 9/02 |

FOREIGN PATENT DOCUMENTS

WO   WO-2015088623 A2 *   6/2015   ............ F01D 25/06
WO          2015112238 A1    7/2015

* cited by examiner

GAS TURBINE ENGINE HAVING A TURBINE ROTOR WITH TORQUE TRANSFER AND BALANCE FEATURES

BACKGROUND

Gas turbine engines, such as geared turbo fans, include a plurality of rotatable sections or stages. These sections or stages include flanges, splines, or other features that enable torque to be transferred between rotating components. These flanges, splines, or other features are added to the gas turbine engine to add weight for balancing purposes. These flanges, splines, and other features may also include rivets or fasteners to further increase weight as needed to improve balancing of the gas turbine engine. Accordingly, it is desirable to provide torque transfer features having balance features.

BRIEF DESCRIPTION

According to an embodiment of the present disclosure, a gas turbine engine is provided. The gas turbine engine includes a rotor disc and a minidisc. The rotor disc has a disc body, a first extension member, and a second extension member. The first extension member axially extends from the disc body. The first extension member has a first finger and a second finger that is circumferentially spaced apart from the first finger. Each of the first finger and the second finger extend axially from the first extension member. The second extension member is radially spaced apart from the first extension member. The second extension member axially extends from the turbine disc body. The minidisc has a minidisc body, an interlocking finger, and a first extension arm. The minidisc body engages the second extension member. The interlocking finger radially extends from the minidisc body and is disposed between the first finger and the second finger. The first extension arm axially extends from the minidisc body.

In addition to one or more of the features described above, or as an alternative to any of the foregoing embodiments, the first extension arm has an extension finger radially extending from a distal end of the first extension arm. The extension finger is configured to receive a balance weight.

In addition to one or more of the features described above, or as an alternative to any of the foregoing embodiments, the interlocking finger engages the first extension member.

In addition to one or more of the features described above, or as an alternative to any of the foregoing embodiments, a distal end of the interlocking finger is configured to receive a balance weight.

In addition to one or more of the features described above, or as an alternative to any of the foregoing embodiments, each of the first finger and the second finger define a notch extending radially in a direction that extends towards the first extension arm.

In addition to one or more of the features described above, or as an alternative to any of the foregoing embodiments, a first balance ring is at least partially received within the notch, the first balance ring having a first balance ring body extending between a first balance ring first end and a first balance ring second end, the first balance ring first end and the first balance ring second end defining a first split disposed there between.

In addition to one or more of the features described above, or as an alternative to any of the foregoing embodiments, the first balance ring body defines a first opening that extends from a first face of the first balance ring body towards a second face of the first balance ring body.

In addition to one or more of the features described above, or as an alternative to any of the foregoing embodiments, the first opening is configured to affix a saddle weight to the first balance ring.

According to another embodiment of the present disclosure, a rotor disc assembly is provided. The rotor disc assembly includes a first extension member, a first finger, and a first balance ring. The first extension member axially extends from a disc body disposed about an axis. The first finger axially extends from the first extension member and defines a notch. The first balance ring is at least partially received within the notch. The first balance ring has a first balance ring body that extends between a first balance ring first end and a first balance ring second end. The first balance ring first end has a first tab that extends radially inward towards the axis. The first balance ring second end has a second tab that extends radially inward towards the axis.

In addition to one or more of the features described above, or as an alternative to any of the foregoing embodiments, the first balance ring first end and the first balance ring second end define a first split disposed therebetween.

In addition to one or more of the features described above, or as an alternative to any of the foregoing embodiments, the notch includes a first notch surface, a second notch surface disposed opposite the first notch surface, and a third notch surface extending between the first notch surface and the second notch surface.

In addition to one or more of the features described above, or as an alternative to any of the foregoing embodiments, the first balance ring body engages the first notch surface and the third notch surface.

In addition to one or more of the features described above, or as an alternative to any of the foregoing embodiments, a second balance ring is at least partially received within the notch and is disposed adjacent to the first balance ring. The second balance ring has a second balance ring body that extends between a second balance ring first end and a second balance ring second end. The second balance ring first end has a third tab that extends radially inward towards the axis. The second balance ring second end has a fourth tab that extends radially inward towards the axis.

In addition to one or more of the features described above, or as an alternative to any of the foregoing embodiments, the second balance ring first end and the second balance ring second end define a second split disposed therebetween.

In addition to one or more of the features described above, or as an alternative to any of the foregoing embodiments, the second balance ring body engages the second notch surface and the third notch surface.

In addition to one or more of the features described above, or as an alternative to any of the foregoing embodiments, the first balance ring and the second balance ring rotatable relative to each other.

According to yet another embodiment of the present disclosure, a rotor disc assembly is provided. The rotor disc assembly includes a rotor disc and a minidisc. The rotor disc has a first extension member, a first finger, and a second finger. The first extension member axially extends from a disc body disposed about an axis. The first finger extends axially from the first extension member. The second finger is circumferentially spaced apart from the first finger. The second finger extends axially from the first extension member. Each of the first finger and the second finger has a first portion and a second portion that extends radially from a distal end of the first portion. The minidisc is operatively connected to the rotor disc. The minidisc has an interlocking finger that radially extends from a minidisc body and is disposed between the first finger and the second finger. The interlocking finger, the first portion, and second portion define a ring groove.

In addition to one or more of the features described above, or as an alternative to any of the foregoing embodiments, a first balance ring at least partially received within the ring groove.

In addition to one or more of the features described above, or as an alternative to any of the foregoing embodiments, the interlocking finger includes a tab radially extending from a distal end of the interlocking finger and is axially spaced apart from the first balance ring.

In addition to one or more of the features described above, or as an alternative to any of the foregoing embodiments, the tab is configured to receive a balance weight.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Referring now to the Figures, where the present disclosure will be described with reference to specific embodiments, without limiting same, it is to be understood that the disclosed embodiments are merely illustrative and may be embodied in various and alternative forms. The Figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
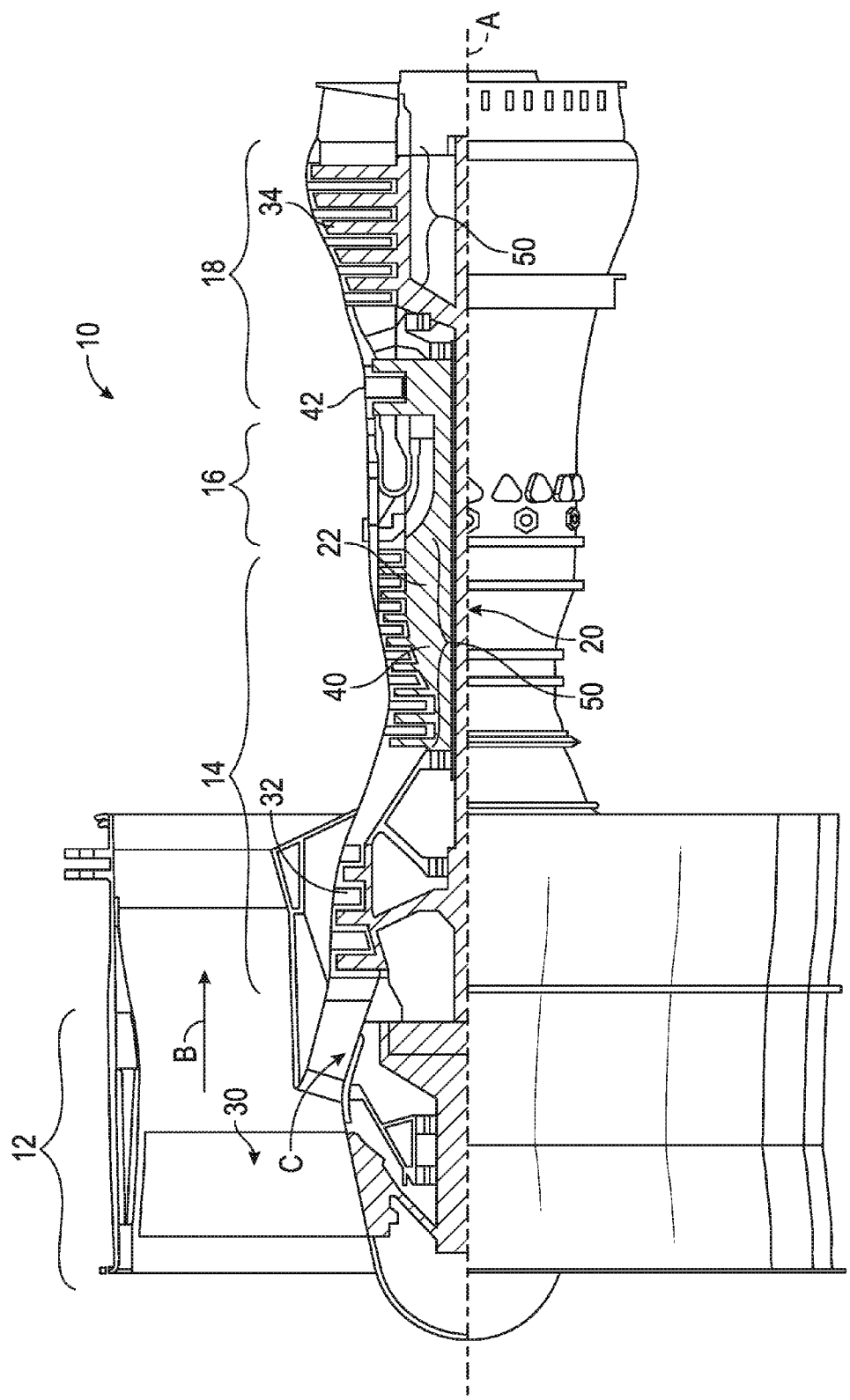
FIG. 1 is a schematic representation of a gas turbine engine.

Referring to FIG. 1 a schematic representation of a gas turbine engine 10 is shown. The gas turbine engine includes a fan section 12, a compressor section 14, a combustor section 16, and a turbine section 18 disposed about a longitudinal axis A. The fan section 12 drives air along a bypass flow path B that may bypass the compressor section 14, the combustor section 16, and the turbine section 18. The compressor section 14 draws air in along a core flow path C where air is compressed by the compressor section 14 and is provided to or communicated to the combustor section 16. The compressed air is heated by the combustor section 16 to generate a high pressure exhaust gas stream that expands through the turbine section 18. The turbine section 18 extracts energy from the high pressure exhaust gas stream to drive the fan section 12 and the compressor section 14.

The gas turbine engine 10 further includes a low-speed spool 20 and a high-speed spool 22 that are configured to rotate the fan section 12, the compressor section 14, and the turbine section 18 about the longitudinal axis A. The low-speed spool 20 may connect a fan 30 of the fan section 12 and a low-pressure compressor portion 32 of the compressor section 14 to a low-pressure turbine portion 34 of the turbine section 18. The high-speed spool 22 may connect a high pressure compressor portion 40 of the compressor section 14 and a high pressure turbine portion 42 of the turbine section 18.

Figure 2:
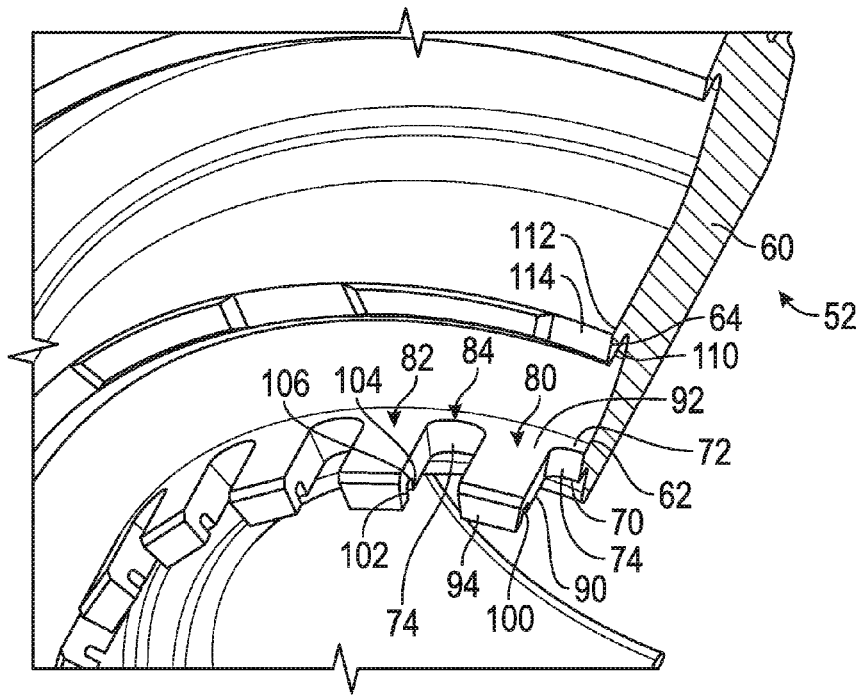
FIG. 2 is a partial perspective view of a rotor disc of a rotor disc assembly provided with the gas turbine engine.
Figure 3:
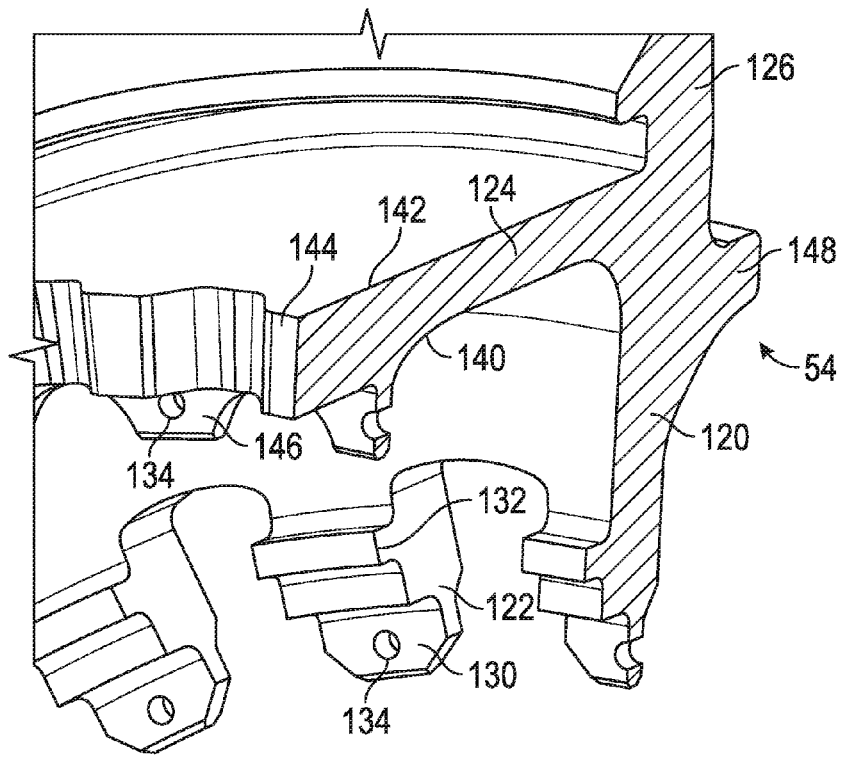
FIG. 3 is a partial perspective view of a minidisc of the rotor disc assembly provided with the gas turbine engine.
Figure 4:
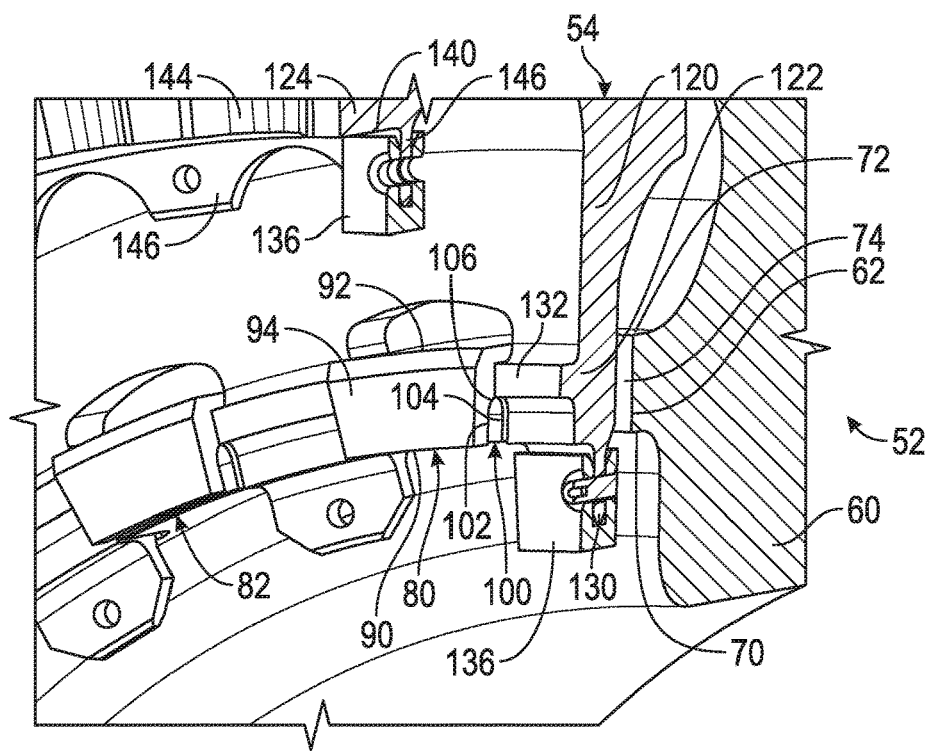
FIG. 4 is a partial perspective view of the rotor disc assembly.

Each of the compressor section 14 and the turbine section 18 are provided with a rotor disc assembly 50. The rotor disc assembly 50 is configured to rotate about the longitudinal axis A and to receive at least one balance ring or weight to aid in the rotational balancing of at least one stage or section of the gas turbine engine 10. Referring to FIGS. 2-4, the rotor disc assembly 50 includes a rotor disc 52 and a minidisc 54 operatively connected to the rotor disc 52.

The rotor disc 52 is configured to support an array of circumferentially arranged blades that are disposed within the core flow path C. The rotor disc 52 is disposed about the longitudinal axis A. The rotor disc 52 includes a disc body 60 having a first extension member 62 and a second extension member 64 that is radially spaced apart from the first extension member 62.

The first extension member 62 axially extends from the disc body 60. The first extension member 62 is disposed substantially parallel to the longitudinal axis A. The first extension member 62 includes a first inner surface 70, a first outer surface 72, and a first end surface 74. The first inner surface 70 is disposed substantially parallel to the longitudinal axis A. The first outer surface 72 is disposed substantially parallel to the first inner surface 70. The first end surface 74 extends between a distal end of each of the first inner surface 70 and the first outer surface 72. The first end surface 74 is disposed substantially perpendicular to the longitudinal axis A.

The first extension member 62 includes a first finger 80 and a second finger 82 that is circumferentially spaced apart from the first finger 80. In at least one embodiment, there are 22 circumferentially equally spaced fingers. The circumferential spacing apart of the second finger 82 from the first finger 80 and a portion of the first end surface 74 define a receiving region 84.

Each of the first finger 80 and the second finger 82 extend axially from the first end surface 74 of the first extension member 62. Each of the first finger 80 and the second finger 82 includes a first finger surface 90, a second finger surface 92, and a finger end surface 94. The first finger surface 90 is disposed substantially parallel to the longitudinal axis A. The first finger surface 90 is disposed substantially parallel to the first inner surface 70. The second finger surface 92 is spaced apart from the first finger surface 90. The second finger surface 92 is disposed substantially parallel to the longitudinal axis A. The second finger surface 92 is disposed substantially parallel to the first outer surface 72. In at least one embodiment, the second finger surface 92 is an extension of the first outer surface 72. The finger end surface 94 extends between a distal end of the first finger surface 90 and a distal end of the second finger surface 92.

Referring to FIGS. 2, 4, 6, and 8, each of the first finger 80 and the second finger 82 define a notch 100. The notch 100 extends from the first finger surface 90 towards the second finger surface 92 in a direction that extends towards the second extension member 64. The notch 100 includes a first notch surface 102, a second notch surface 104, and a third notch surface 106.

The first notch surface 102 is disposed substantially parallel to the first end surface 74 and the finger end surface 94. The first notch surface 102 is disposed proximate the finger end surface 94. In at least one embodiment, the first notch surface 102 defines an antirotation recess that extends from the first notch surface 102 towards the finger end surface 94. The second notch surface 104 is spaced apart from and is disposed opposite the first notch surface 102. The second notch surface 104 is disposed substantially parallel to the first end surface 74 and the finger end surface 94. The second notch surface 104 is disposed closer to the first end surface 74 than the first notch surface 102. In at least one embodiment, the second notch surface 104 defines an antirotation recess that extends from the second notch surface 104 towards the first end surface 74. The third notch surface 106 extends between the first notch surface 102 and the second notch surface 104. The third notch surface 106 is disposed closer to the second finger surface 92 than the first finger surface 90.

The second extension member 64 is radially spaced apart from the first extension member 62. The second extension member 64 axially extends from the disc body 60 and is disposed substantially parallel to the first extension member 62. The second extension member 64 includes a second inner surface 110, a second outer surface 112, and a second end surface 114. The second inner surface 110 is disposed substantially parallel to the longitudinal axis A. The second outer surface 112 is disposed substantially parallel to the second inner surface 110. The second end surface 114 extends between a distal end of each of the second inner surface 110 and the second outer surface 112. The second end surface 114 is disposed substantially perpendicular to the longitudinal axis A. The second end surface 114 is disposed substantially parallel to but not coplanar with the first end surface 74.

An axial length of the second extension member 64 that extends from the disc body 60 towards the second end surface 114 is less than an axial length of the first extension member 62 that extends from the disc body 60 towards the first end surface 74.

The minidisc 54 is operatively connected to the rotor disc 52. The minidisc 54 may function as a cover plate or seal that extends between the rotor disc 52 and a rotor blade that extends from the rotor disc 52. The minidisc 54 is configured to provide torque transfer for the section of the gas turbine engine as well as providing a mechanism to receive balancing features. The minidisc 54 includes a minidisc body 120 having an interlocking finger 122, a first extension arm 124, and a second extension arm 126.

The interlocking finger 122 radially extends from the minidisc body 120. The interlocking finger 122 is configured to engage the first end surface 74 of the first extension member 62. The interlocking finger 122 is received within the receiving region 84 that is disposed between the first finger 80 and the second finger 82.

The interlocking finger 122 includes a tab 130 and a nub 132. The tab 130 radially extends from a distal end of the interlocking finger 122. The tab 130 defines an opening 134 that axially extends completely through the tab 130. The opening 134 is configured to receive a saddle weight or a balance weight 136 that is coupled to the tab 130 of the interlocking finger 122 by a fastener.

The nub 132 axially extends from the interlocking finger 122 in a direction that extends towards the finger end surface 94. The nub 132 is disposed substantially parallel to the first finger 80 and the second finger 82. In at least one embodiment, the nub 132 is disposed above the notch 100 of at least one of the first finger 80 and the second finger 82.

The first extension arm 124 axially extends from the minidisc body 120. The first extension arm 124 is disposed transverse to the interlocking finger 122. The first extension arm 124 is disposed substantially parallel to the nub 132. The first extension arm 124 includes an extension inner surface 140, an extension outer surface 142, and an extension end surface 144.

The extension inner surface 140 is disposed substantially parallel to the longitudinal axis A. The extension inner surface and 140 includes an extension finger or an extension tab 146. The extension tab 146 extends radially from the extension inner surface 140 in a direction that extends towards the first extension member 62 and the first finger 80 and the second finger 82. The extension tab 146 is disposed proximate a distal end of the first extension arm 124. The extension tab 146 defines an opening 134 that axially extends completely through the extension tab 146. The opening 134 is configured to receive a saddle weight or a balance weight 136 that is coupled to the extension tab 46 of the first extension arm 124 by a fastener.

The extension outer surface 142 is disposed substantially parallel to the extension inner surface 140. The extension end surface 144 extends between distal ends of the extension inner surface 140 and the extension outer surface 142. The extension end surface 144 is disposed substantially perpendicular to the longitudinal axis A. The extension end surface 144 is disposed substantially parallel to but not coplanar with the first end surface 74.

In at least one embodiment, the minidisc 54 includes an aft arm 148. The aft arm 148 axially extends from the minidisc body 120 in a direction that extends opposite or away from the extension end surface 144 of the first extension arm 124. The aft arm 148 is configured to engage the second inner surface 110 of the second extension member 64 of the rotor disc 52.

The second extension arm 126 radially extends from the minidisc body 120. The second extension arm 126 extends radially from the minidisc body 120 in a direction that extends opposite or away from the tab 130 of the interlocking finger 122. The second extension arm 126 is configured to engage the second end surface 114 of the second extension member 64.

Figure 5:
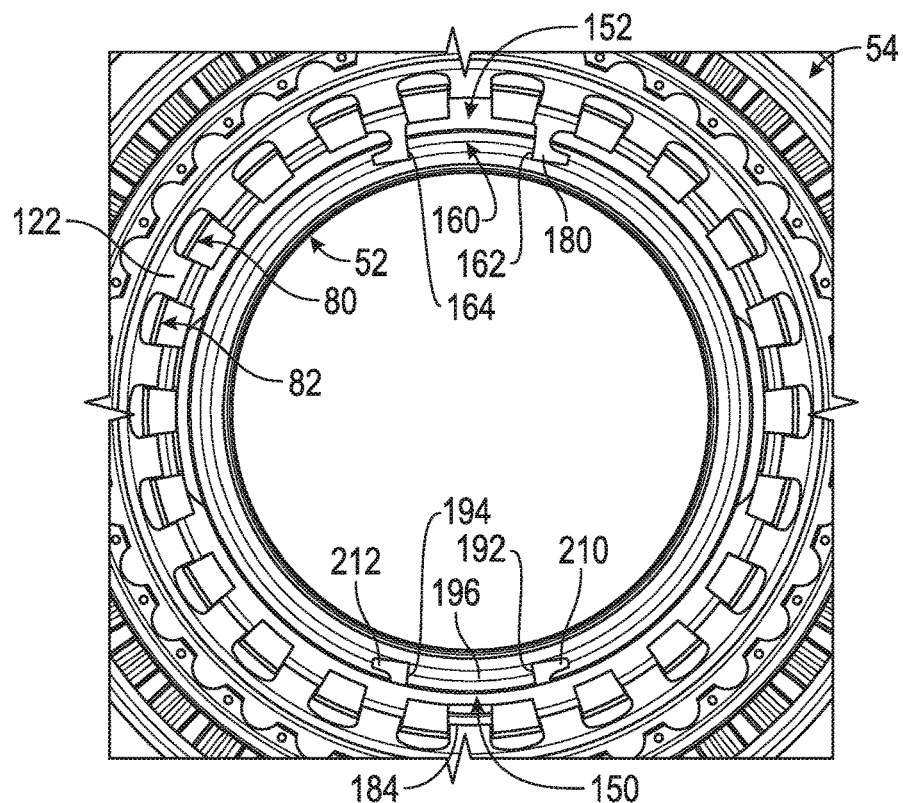
FIG. 5 is a partial end view of the rotor disc assembly having first and second balance rings.
Figure 6:
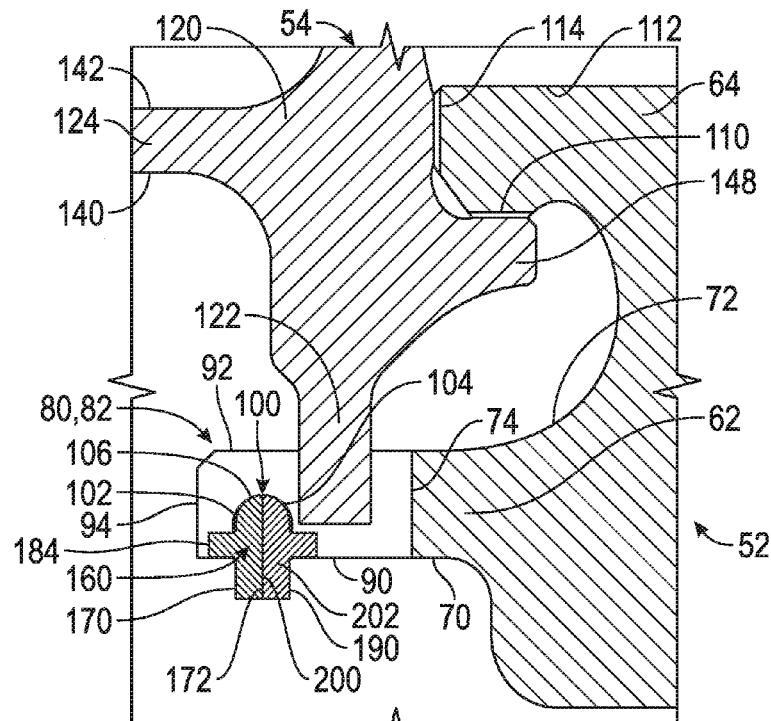
FIG. 6 is a side sectional view of the rotor disc assembly having first and second balance rings.
Figure 7:
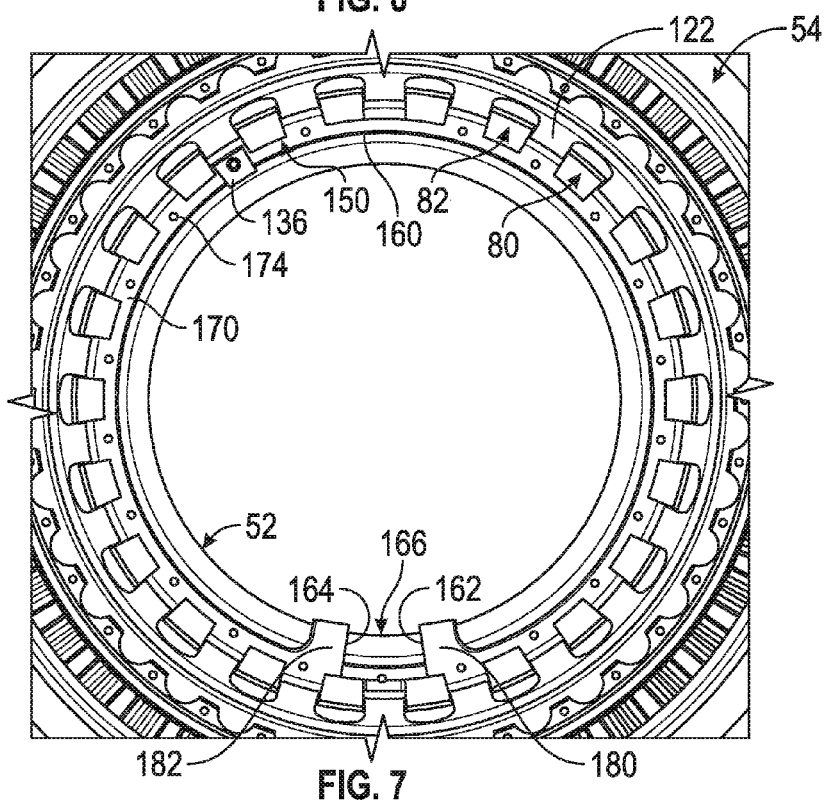
FIG. 7 is a partial end view of the rotor disc assembly having a balance ring.

Referring to FIGS. 5-7, a first balance ring 150 and a second balance ring 152 may be provided with the rotor disc assembly 50. The first balance ring 150 may be at least partially received within the notch 100 of the first finger 80 and the second finger 82 of the first extension member 62.

The first balance ring 150 includes a first balance ring body 160 that extends between a first balance ring first end 162 and a first balance ring second end 164 that are separated by a first split 166. The first balance ring body 160 includes a first balance ring first face 170 and a first balance ring second face 172. The first balance ring first face 170 is configured to engage the first notch surface 102 of the notch 100. The first balance ring body 160 is configured to engage the third notch surface 106 of the notch 100.

The first balance ring body 160 defines a first opening 174 that extends from the first balance ring first face 170 to the first balance ring second face 172. The first balance ring body 160 is configured to receive a fastener to couple a saddle weight or a balance weight 136 to the first balance ring 150.

Figure 8:
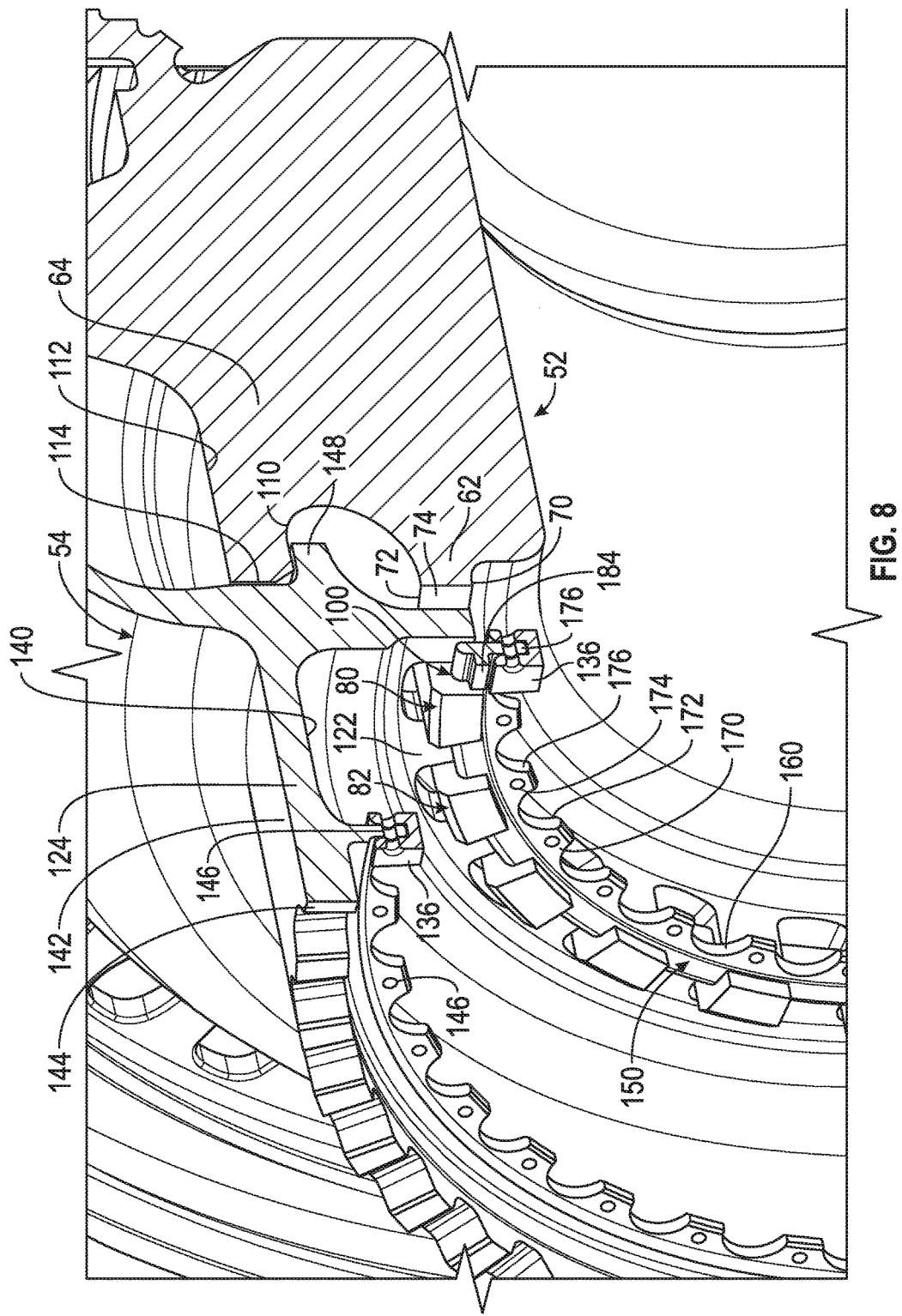
FIG. 8 is a partial perspective view of the rotor disc assembly having the balance ring.
Figure 9:
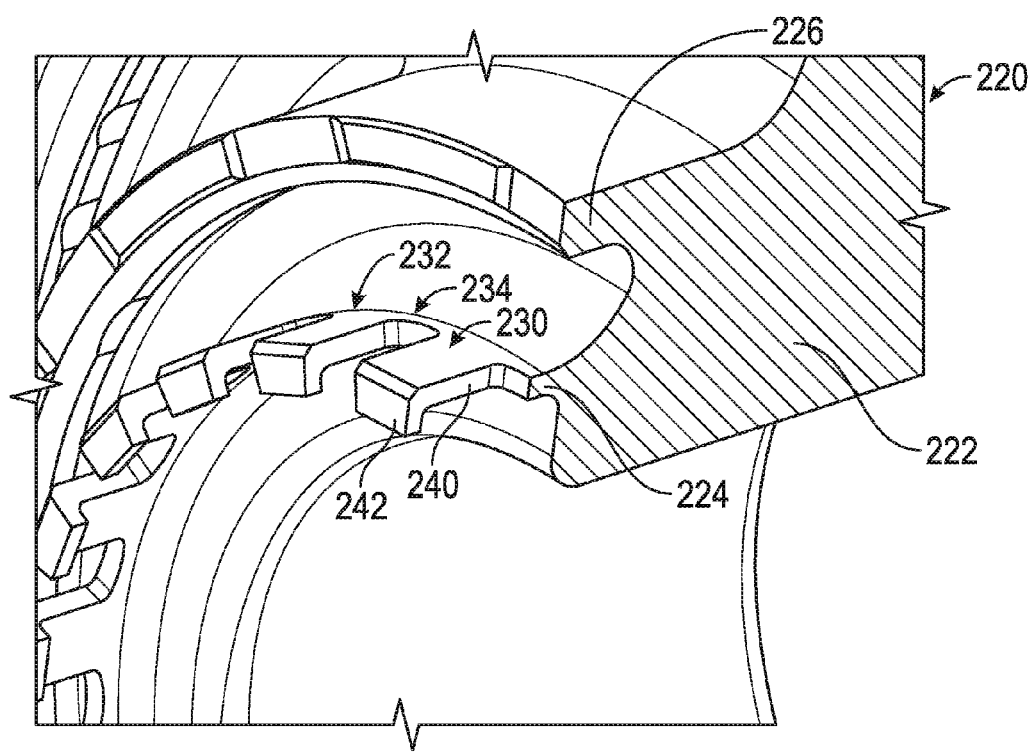
FIG. 9 is a partial perspective view of a rotor disc of a rotor disc assembly provided with a gas turbine engine.
Figure 10:
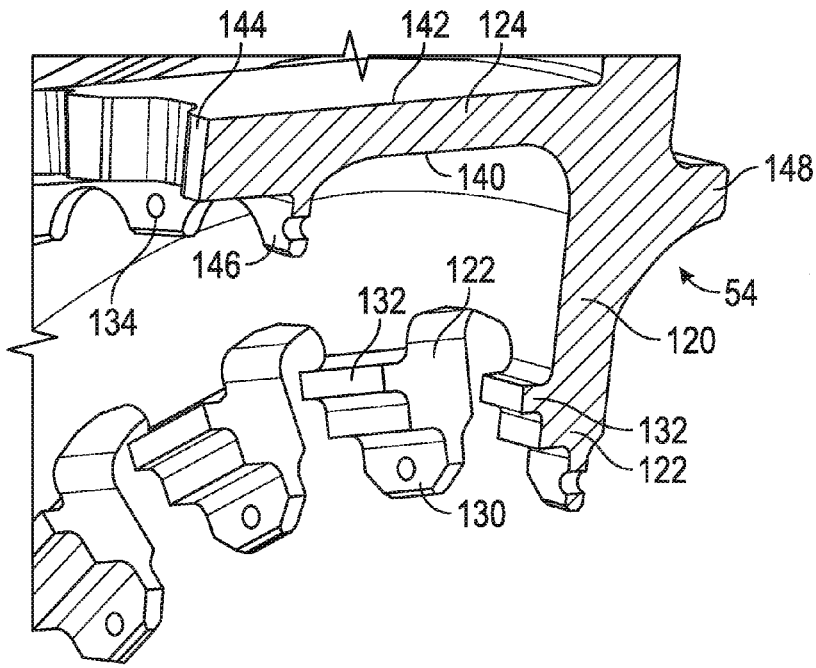
FIG. 10 is a partial perspective view of a minidisc of the rotor disc assembly provided with a gas turbine engine.
Figure 11:
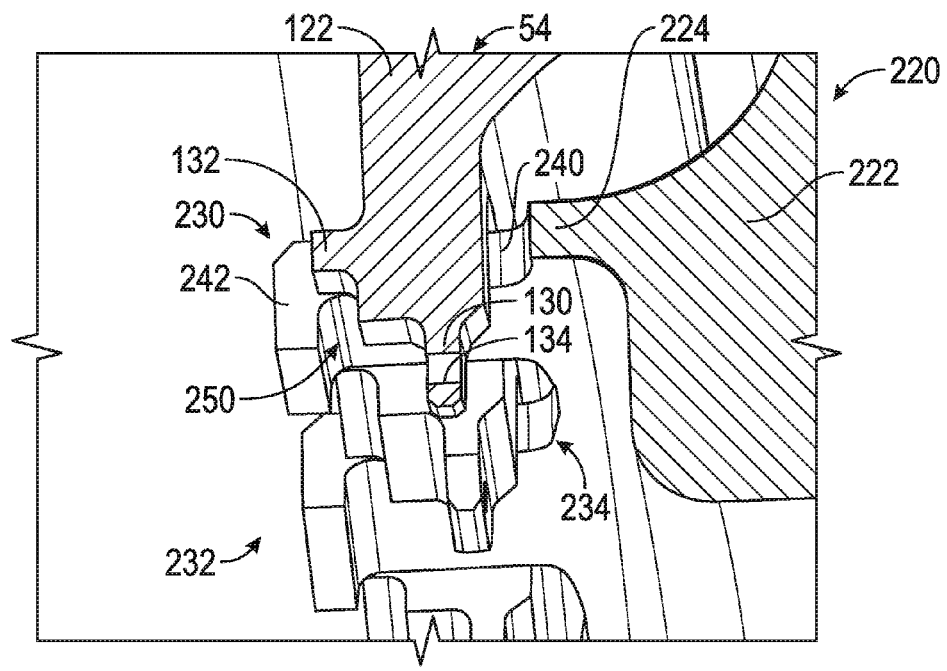
FIG. 11 is a partial perspective view of the rotor disc assembly provided with the gas turbine engine.
Figure 12:
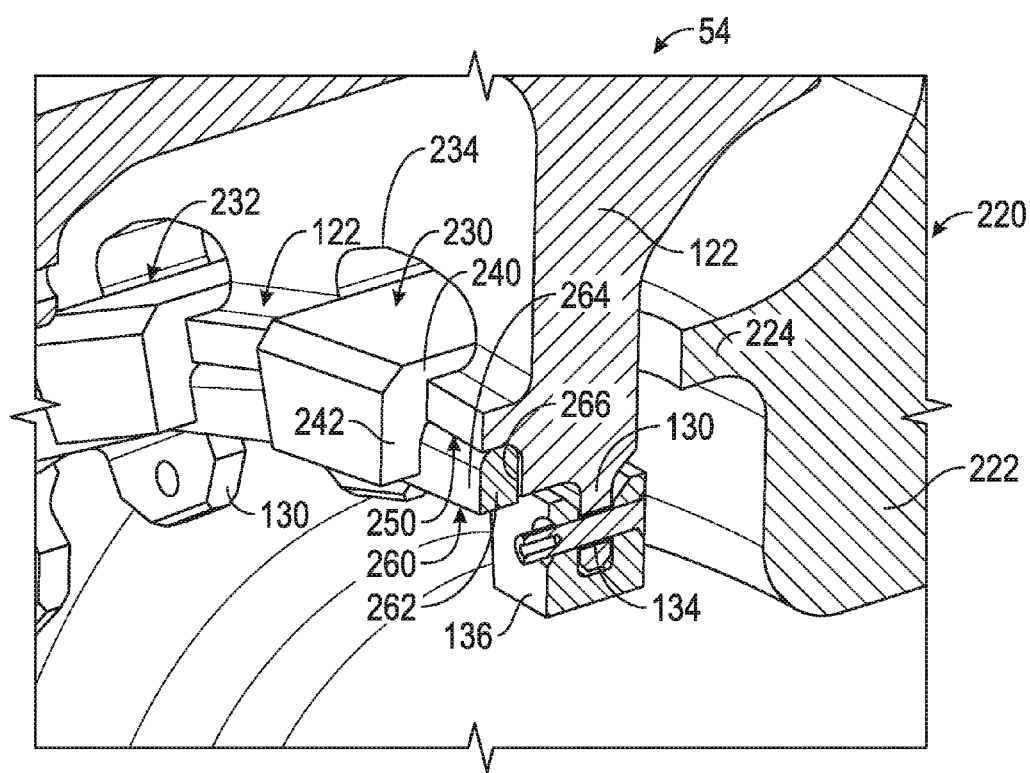
FIG. 12 is a partial perspective view of rotor disc assembly provided with the gas turbine engine having a balance ring.

Referring to FIG. 8, the first balance ring second face 172 is configured to engage the second notch surface 104. The first balance ring body 160 defines inwardly radially extending mounting tab 176. In such an embodiment, the first opening 174 extends axially completely through the mounting tab 176.

Referring to FIGS. 5-7, the first balance ring first end 162 and the first balance ring second end 164 are spaced apart from each other such that the first split 166 is disposed between the first balance ring first end 162 and the first balance ring second end 164. The first balance ring first end 162 includes a first tab 180. The first tab 180 extends radially inward from the first balance ring first end 162 towards the longitudinal axis A. The first balance ring second end 164 includes a second tab 182. The second tab 182 is radially inwardly extending from the first balance ring second end 164 towards the longitudinal axis A.

In at least one embodiment, the first balance ring first face 170 includes an axially extending locating feature 184. The locating feature 184 is configured to lock or retain the first balance ring 150 in a clocked position to correct for a potential imbalance within a section of the gas turbine engine 10. The locating feature 184 may be received within an antirotation recess formed within the first notch surface 102 or the second notch surface 104 of the notch 100 or between the first notch surface 102 and the second notch surface 104 of the notch 100.

The second balance ring 152 may be at least partially received within the notch 100 of the first finger 80 and the second finger 82 of the first extension member 62. The second balance ring 152 includes a second balance ring body 190 that extends between a second balance ring first end 192 and a second balance ring second end 194 that are separated by a second split 196. The second balance ring body 190 includes a second balance ring first face 200 and a second balance ring second face 202. The second balance ring first face 200 is configured to engage the first balance ring second face 172 of the first balance ring 150. The second balance ring body 190 is configured to engage the third notch surface 106 of the notch 100. The second balance ring second face 202 is configured to engage the second notch surface 104 of the notch 100.

The second balance ring first end 192 and the second balance ring second end 194 are spaced apart from each other such that the second split 196 is disposed between the second balance ring first end 192 and the second balance ring second end 194. The second balance ring first end 192 includes a third tab 210. The third tab 210 extends radially inward from the second balance ring first end 192 towards the longitudinal axis A. The second balance ring second end 194 includes a fourth tab 212. The fourth tab 212 extends radially inward from the second balance ring second end 194 towards the longitudinal axis A.

The first balance ring 150 is naturally imbalanced due to the first split 166 between the first balance ring first end 162 and the first balance ring second end 164. The first tab 180 and the second tab 182 are sized such that the imbalance from the first split 166 is negated and the first balance ring 150 has no imbalance.

The second balance ring 152 is naturally imbalanced due to the second split 196 between the second balance ring first end 192 and the second balance ring second end 194. The third tab 210 and the fourth tab 212 are sized such that the imbalance from the second split 196 is negated and the second balance ring 152 has no imbalance.

The first balance ring 150 and the second balance ring 152 are configured to be rotatable relative to each other or clocked relative to each other to correct any rotational imbalance of the rotor disc assembly 50 or the respective section of the gas turbine engine 10.

Referring to FIGS. 9-12, a second embodiment of a rotor disc 220 is shown. The rotor disc 220 is configured to support an array of circumferentially arranged blades that are disposed within the core flow path C. The rotor disc 220 is disposed about the longitudinal axis A. The rotor disc 220 includes a disc body 222 having a first extension member 224 and a second extension member 226 radially spaced apart from the first extension member 224.

The first extension member 224 axially extends from the disc body 222. The first extension member 224 is disposed substantially parallel to the longitudinal axis A. The first extension member 224 includes a first finger 230 and a second finger 232 that is circumferentially spaced apart from the first finger 230. The circumferential spacing apart of the second finger 232 from the first finger 230 defines a receiving region 234.

Each of the first finger 230 and the second finger 232 extend axially from the first extension member 224. Each of the first finger 230 and the second finger 232 includes a first portion 240 and a second portion 242. The first portion 240 extends axially and the second portion 242 extends radially from a distal end of the first portion 240 towards the longitudinal axis A.

The minidisc 54 is operatively connected to the rotor disc 220. The interlocking finger 122 of the minidisc 54 radially extends from the minidisc body 120. The interlocking finger 122 is spaced apart from the first extension member 224. The interlocking finger 122 is disposed between the first finger 230 and the second finger 232.

The nub 132 axially extends from the interlocking finger 122, the interlocking finger 122, and the first portion 240 and the second portion 242 of at least one of the first finger 230 and the second finger 232 defines a ring groove 250. A forward portion of the ring groove 250 is defined by the first portion 240 and the second portion 242 of at least one of the first finger 230 and the second finger 232. A top portion of the ring groove 250 is defined by the nub 132 of the interlocking finger 122 and an aft portion of the ring groove 250 is defined by the surface of the finger 122 beneath the nub 132.

A balance ring 260 is at least partially received within the ring groove 250. The balance ring 260 includes a balance ring body 262 having a balance ring first face 264 and a balance ring second face 266. The balance ring first face 264 is configured to engage the second portion 242. The balance ring body 262 is configured to engage the first portion 240 and the nub 132. The balance ring second face 266 is configured to engage the interlocking finger 122.

The balance ring 260 is rotatable for balance correction. In at least one embodiment, the saddle weight or the balance weight 136 are affixed to the balance ring body 262 of the balance ring 260 for balance correction.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

The invention claimed is:

1. A gas turbine engine, comprising:
   a rotor disc, including:
      a disc body,
      a first extension member axially extending from the disc body, the first extension member having a first finger and a second finger circumferentially spaced apart from the first finger, each of the first finger and the second finger extending axially from the first extension member, and
      a second extension member radially spaced apart from the first extension member, the second extension member axially extending from the turbine disc body; and
   a minidisc, including:
      a minidisc body that engages the second extension member,
      an interlocking finger radially extending from the minidisc body and disposed between the first finger and the second finger, and a first extension arm axially extending from the minidisc body,
      wherein the first extension arm has an extension finger radially extending from a distal end of the first extension arm, the extension finger is configured to receive a balance weight.

2. The gas turbine engine of claim 1, wherein the interlocking finger engages the first extension member.

3. The gas turbine engine of claim 1, wherein a distal end of the interlocking finger is configured to receive a balance weight.

4. The gas turbine engine of claim 1, wherein each of the first finger and the second finger define a notch extending radially in a direction that extends towards the first extension arm.

5. The gas turbine engine of claim 4, further comprising:
   a first balance ring at least partially received within the notch, the first balance ring having a first balance ring body extending between a first balance ring first end and a first balance ring second end, the first balance ring first end and the first balance ring second end defining a first split disposed there between.

6. The gas turbine engine of claim 5, wherein the first balance ring body defines a first opening that extends from a first face of the first balance ring body towards a second face of the first balance ring body.

7. The gas turbine engine of claim 6, wherein the first opening is configured to affix a saddle weight to the first balance ring.

8. A rotor disc assembly, comprising:
   a first extension member axially extending from a disc body disposed about an axis;
   a first finger axially extending from the first extension member, the first finger defining a notch;
   a first balance ring at least partially received within the notch, the first balance ring having a first balance ring body extending between a first balance ring first end and a first balance ring second end, the first balance ring first end having a first tab extending radially inward towards the axis and the first balance ring second end having a second tab extending radially inward towards the axis, wherein the first balance ring first end and the first balance ring second end define a first split disposed there between, wherein the notch includes a first notch surface, a second notch surface disposed opposite the first notch surface, and a third notch surface extending between the first notch surface and the second notch surface, and wherein the first balance ring body engages the first notch surface and the third notch surface; and
   a second balance ring at least partially received within the notch and disposed adjacent to the first balance ring, the second balance ring having a second balance ring body extending between a second balance ring first end and a second balance ring second end, the second balance ring first end having a third tab extending radially inward towards the axis and the second balance ring second end having a fourth tab extending radially inward towards the axis.

9. The rotor disc assembly of claim 8, wherein the second balance ring first end and the second balance ring second end define a second split disposed there between.

10. The rotor disc assembly of claim 9, wherein the second balance ring body engages the second notch surface and the third notch surface.

11. The rotor disc assembly of claim 10, wherein the first balance ring and the second balance ring rotatable relative to each other.

12. A rotor disc assembly, comprising:
   a rotor disc having:
      a first extension member axially extending from a disc body disposed about an axis;
      a first finger extending axially from the first extension member;
      a second finger circumferentially spaced apart from the first finger, the second finger extending axially from the first extension member, each of the first finger and the second finger having a first portion and a second portion extending radially from a distal end of the first portion; and
   a minidisc operatively connected to the rotor disc having:
      an interlocking finger radially extending from a minidisc body and disposed between the first finger and the second finger, wherein the interlocking finger, the first portion, and the second portion define a ring groove.

13. The rotor disc assembly of claim 12, further comprising:
   a first balance ring at least partially received within the ring groove.

14. The rotor disc assembly of claim 13, wherein the interlocking finger includes a tab radially extending from a distal end of the interlocking finger and is axially spaced apart from the first balance ring.

15. The rotor disc assembly of claim 14, wherein the tab is configured to receive a balance weight.

16. A gas turbine engine, comprising:
   a rotor disc, including:
      a disc body,
      a first extension member axially extending from the disc body, the first extension member having a first finger and a second finger circumferentially spaced apart from the first finger, each of the first finger and the second finger extending axially from the first extension member, and a second extension member radially spaced apart from the first extension member, the second extension member axially extending from the turbine disc body; and a minidisc, including:
a minidisc body that engages the second extension member,
an interlocking finger radially extending from the minidisc body and disposed between the first finger and the second finger, and a first extension arm axially extending from the minidisc body,
wherein a distal end of the interlocking finger is configured to receive a balance weight.

17. The gas turbine engine of claim 16, wherein the interlocking finger engages the first extension member.

18. The gas turbine engine of claim 16, wherein each of the first finger and the second finger define a notch extending radially in a direction that extends towards the first extension arm.

19. The gas turbine engine of claim 18, further comprising:
a first balance ring at least partially received within the notch, the first balance ring having a first balance ring body extending between a first balance ring first end and a first balance ring second end, the first balance ring first end and the first balance ring second end defining a first split disposed there between.

20. The gas turbine engine of claim 19, wherein the first balance ring body defines a first opening that extends from a first face of the first balance ring body towards a second face of the first balance ring body.

21. The gas turbine engine of claim 20, wherein the first opening is configured to affix a saddle weight to the first balance ring.

22. A gas turbine engine, comprising:
a rotor disc, including:
a disc body,
a first extension member axially extending from the disc body, the first extension member having a first finger and a second finger circumferentially spaced apart from the first finger, each of the first finger and the second finger extending axially from the first extension member, and
a second extension member radially spaced apart from the first extension member, the second extension member axially extending from the turbine disc body; and
a minidisc, including:
a minidisc body that engages the second extension member,
an interlocking finger radially extending from the minidisc body and disposed between the first finger and the second finger, and a first extension arm axially extending from the minidisc body, wherein each of the first finger and the second finger define a notch extending radially in a direction that extends towards the first extension arm; and
a first balance ring at least partially received within the notch, the first balance ring having a first balance ring body extending between a first balance ring first end and a first balance ring second end, the first balance ring first end and the first balance ring second end defining a first split disposed there between.

23. The gas turbine engine of claim 22, wherein the interlocking finger engages the first extension member.

24. The gas turbine engine of claim 22, wherein the first balance ring body defines a first opening that extends from a first face of the first balance ring body towards a second face of the first balance ring body.

25. The gas turbine engine of claim 24, wherein the first opening is configured to affix a saddle weight to the first balance ring.

* * * * *